Figure 1:
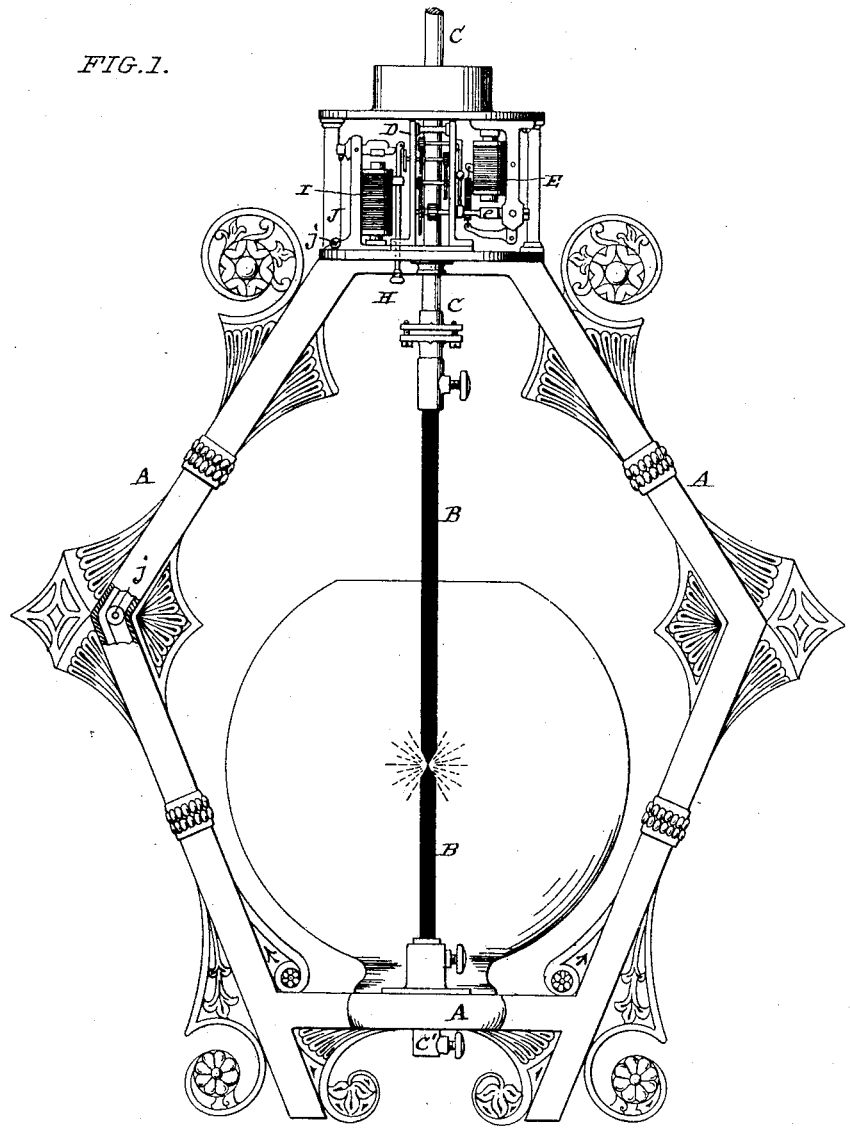

(No Model.) 3 Sheets—Sheet 1.

C. HEISLER.
Electric Lamp.

No. 239,044. Patented March 22, 1881.

ATTEST
Robt Burns
L. C. Morris

INVENTOR:
Charles Heisler (No Model.) 3 Sheets—Sheet 2.
C. HEISLER.
Electric Lamp.
No. 239,044. Patented March 22, 1881.
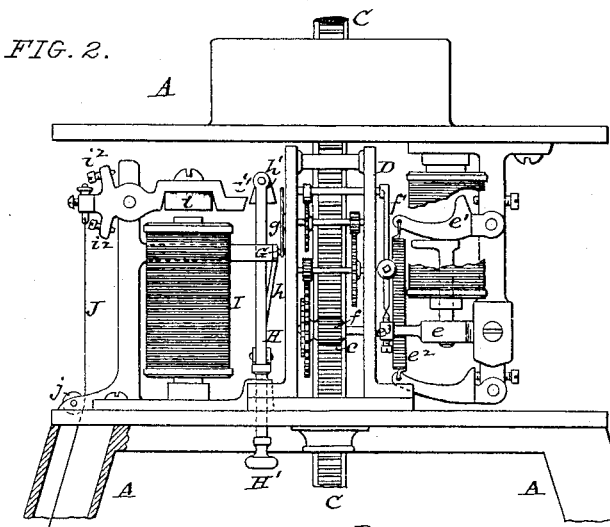
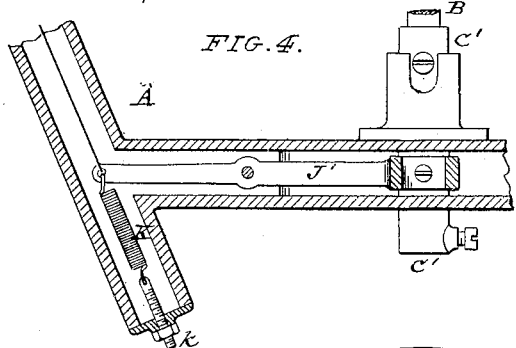
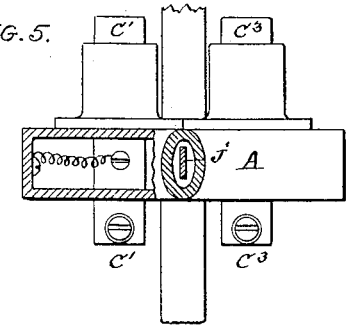
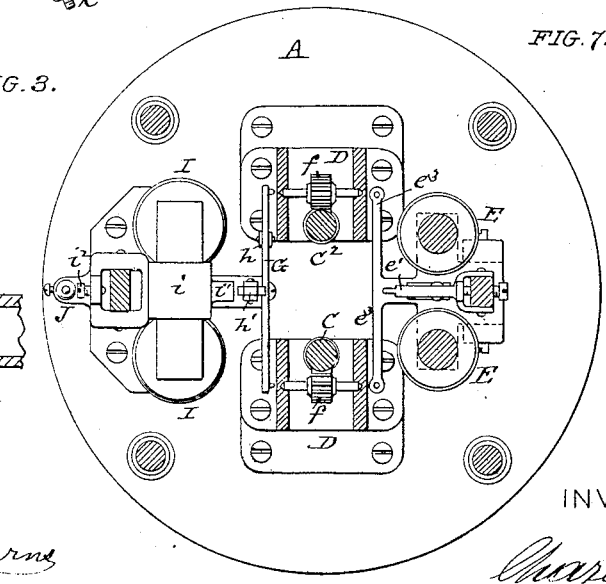
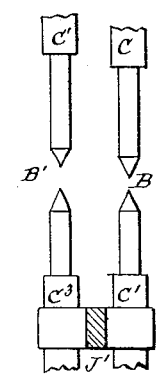
ATTEST:
Robt Burns
L C Morse
INVENTOR:
Charles Heisler (No Model.) 3 Sheets—Sheet 3.
C. HEISLER.
Electric Lamp.
No. 239,044. Patented March 22, 1881.
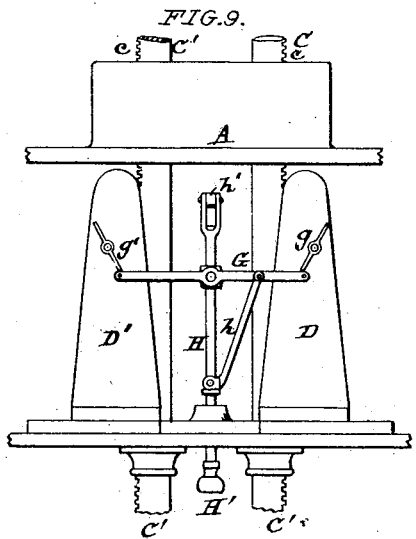
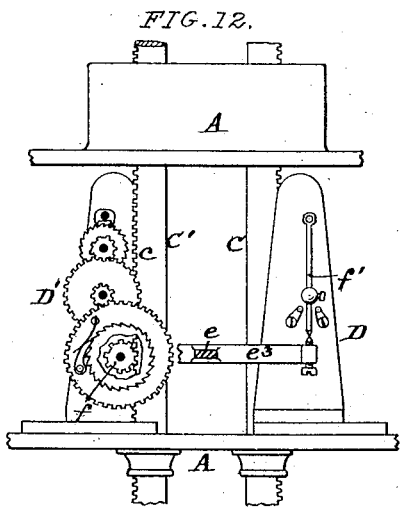
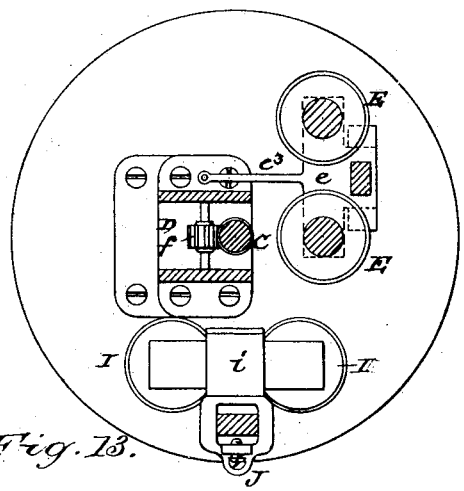
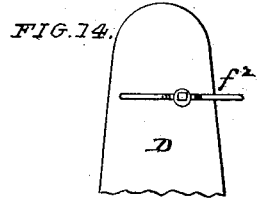
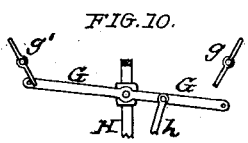
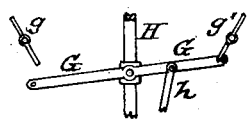
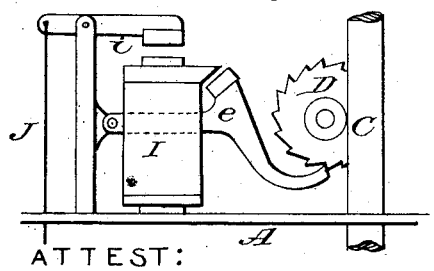
ATTEST:
Robt Burns
L. C. Morse
INVENTOR:
Charles Heisler

UNITED STATES PATENT OFFICE.

CHARLES HEISLER, OF ST. LOUIS, MISSOURI.

ELECTRIC LAMP.

SPECIFICATION forming part of Letters Patent No. 239,044, dated March 22, 1881.

Application filed May 12, 1880. (No model.)

*To all whom it may concern:*

Be it known that I, CHARLES HEISLER, of the city of St. Louis, in the State of Missouri, have invented certain new and useful Improvements in Electric Lamps; and I do hereby declare that the following is a full, clear, and exact description of the invention, such as will enable others skilled in the art to which it pertains to make and use it, reference being had to the accompanying drawings, which form part of this specification.

This invention relates to certain constructive features of electric lamps of the arc type, and to the mode of regulating and adjusting the carbons or electrodes of the same.

This invention consists—

First, in the use, in an electric lamp, of two or more sets of carbons adapted by suitable mechanism to burn successively, one of the sets forming connection for the free passage of the electric current, and by its passage establishing the voltaic arc between the carbons of said set, the remaining set or sets being held apart at a suitable distance—say one-eighth of an inch—in order to direct the electric current into that set of carbons which is forming the voltaic arc. Whenever the carbons of the first set are consumed, or from any cause the voltaic arc becomes broken, or the resistance of the arc too great, the next set of carbons will be automatically released, so as to come together and establish the voltaic arc between them, and so on through the different sets of carbons when more than two sets are used.

Secondly, in the provision, in an electric lamp having two or more sets of carbons, of the lower members of the same, arranged to be let down or withdrawn simultaneously, so as to form the voltaic arc between that set of carbons which had previously been placed in contact. The movements for effecting this object are automatically accomplished by means of an electro-magnet and lever and cord connections, as hereinafter described.

Thirdly, in the combination, with an electric lamp having two or more sets of carbons, of an automatic escapement operated by an electro-magnet, as hereinafter described—which device is capable of operation by hand—and by means of which any one or all the sets may be stopped at any suitable distance, and leaving any one set in position to complete the circuit and form the voltaic arc.

Figure 1 is a side elevation of a lamp, illustrating the general construction and arrangement of my invention. Fig. 2 is a detail front elevation of the retarding and adjusting devices at the top of the lamp, and which also illustrates the arrangement of parts when two sets of carbons or electrodes are used. Fig. 3 is a plan view, partly in section, of the same. Fig. 4 is a detail sectional elevation, showing the means for moving the lower carbons or electrodes. Fig. 5 is a detail transverse section of the same. Fig. 6 is a detail sectional plan of the same. Fig. 7 is a diagram illustrating the position of the carbons when two sets are used in a lamp. Fig. 8 is a detail plan, partly in section, illustrating the arrangement of parts for a lamp using a single set of carbons. Fig. 9 is a detail side view of the escapement device for reversing the carbons in a lamp using two or more sets of carbons. Figs. 10 and 11 are diagram views illustrating the different positions which the escapement device assumes in use. Fig. 12 is a detail side view, partly in section, of one form of retarding device for regulating and controlling the descent of the holder of the upper carbon electrode. Fig. 14 is a detail view of a modified form of the retarding device. Fig. 13 is a detail view of a single electro-magnet with independent armatures for governing the retarding device and raising and lowering the lower-carbon holder or holders.

In use I prefer to have a separate circuit to each lamp, as I can obtain better and more complete results from such an arrangement; still, if desired, two or more lamps may be used in a single circuit.

The supporting-frame A is of any suitable form and construction, so as to give support to the carbon or electrode holders, which are arranged to move together at proper times, and by mechanism as hereinafter described.

In Figs. 1, 2, 3, 4, 5, 6, 7, 9, 10, 11, and 12, I have shown the duplicate arrangement of parts required in a lamp using two sets of carbons, which duplication can be continued when it is desired to use more than two sets of carbons in a single lamp. In Fig. 8 I have shown the single arrangement with position of parts required in a lamp having a single set of carbons.

B represents one set and B' another set of carbons, having holders C C' C² C³, as usual. The upper-carbon holders move independently of each other, and each is provided with an independent retarding device, D D', by which their speed in descending is regulated and made uniform, and which is altogether stopped at the proper time by means of the armature $e$ of an electro-magnet, E, operated by the electric current that operates the lamp, which armature is released, so as to allow the holder to descend, as the resistance of the voltaic arc increases, owing to the consumption of the particles of the carbon electrodes. The armature $e$ acts to engage and release the carbon-holder by engaging a pendulum, fan, or ratchet escapement on a rotating retarding device, D D', connected to said holder. The constructive features of the retarding device may be materially changed and modified without departing from the spirit of my invention.

In Figs. 2, 3, 8, and 12 a train of gearing, F, is shown operated by a rack, $c$, on the carbon-holder, the movement of said gearing being regulated by a pendulum, $f'$, Figs. 2 and 12, or a fan, $f^2$, Fig. 14; or any other well-known form of escapement may be used.

In place of the rack and pinion $e f$, for communicating motion from the carbon-holder to its retarding device, friction alone may be employed, as indicated in Fig. 14, in which a friction-wheel, $f^4$, of any suitable construction, is rotated by a plain carbon-holder.

The armature $e$ of the electro-magnet E is connected to a compensating-lever, $e'$, and spring $e^2$, which offers a gradually-increasing resistance to the movement of the armature toward the electro-magnet. The purpose of this arrangement is to render the electro-magnet very sensitive to the slightest change in the resistance of the voltaic arc.

When two or more sets of carbons are used in a lamp the armature-extension $e^3$ will be branched and have provisions, as shown, for engaging the escapement of each separate retarding device D D' used.

The construction and arrangement of parts so far described can only be used in a lamp having a single pair of carbons or electrodes. In lamps having two or more pairs of carbons to be consumed successively it will require additional devices in order to automatically consume the same consecutively. Such mechanism is shown in Figs. 2, 3, 9, 10, and 11, for effecting the purpose in an electric lamp having two sets of carbons, and which mechanism can be readily modified to suit a lamp having more sets when desired.

$g$ $g'$ are rotating flies or spiders connected to and rotating with the retarding devices D D'. These flies or spiders are prevented from rotating by being engaged by a pivoted escapement-lever, G, having engagement-pins at each end. The lever G is connected by link $h$ to a vertically-sliding bar, H, having at top a pivoted dog, $h'$, which is engaged by a toe, $i'$, of the armature $i$ of an electro-magnet, I. The lower end of the bar is provided with a thumb-knob, H', by which it can be operated by hand when desired. The action of this device is very fully shown by its different positions in Figs. 9, 10, and 11.

In Fig. 9 the device is shown in position to stop any movement of both carbon-holders. In Fig. 10 it is shown in position to allow a feeding motion of the first set of carbons, and in Fig. 11 to allow the other set of carbons to feed together, as required.

The armature $i$, in addition to operating the escapement-lever H, as above described, also acts to lower or draw down the lower-carbon holders C' C³, through a cord or chain, J, guided over suitable pulleys, $j$, and connected to one end of a lever, J', the other end of which is attached to carbon holder, or holders where more than one is used.

K is a spring connected to the ends of the lever J', opposite to the carbon-holders, for forcing the same upward, when the armature $i$ is not attracted by its electro-magnet.

$k$ is a temper-screw for regulating the tension of the spring K.

The movement of the armature $i$ is also adjusted and regulated by set-screws $i^2$, as clearly indicated in Fig. 2.

In lamps using but a single set of carbons the use of the separate electro-magnets E I can be dispensed with and a single electro-magnet, E², having two armatures, $e$ $i$, as shown in Fig. 13, used to effect the purpose of both, the compensating lever and spring $e'$ $e^2$ being used in connection with one or both armatures, as desired.

The operation of my improved lamp is as follows: After the carbons have been placed in proper position in their holders the escapement-lever G is drawn by hand into the position shown in Fig. 9, which allows both carbon-holders to descend until the first set is in contact, when the lever is drawn down into the position shown in Fig. 10, so as to lock the other set of carbons (by engaging the fly $g'$ of its retarding device D') at a suitable distance apart—say one-eighth of an inch apart, more or less. The proper relative positions of the two carbon sets are clearly shown in Fig. 7. As the particles of carbon of the first set are destroyed by the voltaic arc, said arc is caused to lengthen, which throws a greater resistance into the electro-magnet E, and its armature is allowed to move away from the same, thereby releasing the upper carbon electrode of the set B, (either directly or through the retarding device D,) and allows the same to descend until the resistance becomes less in the electro-magnet E, when the armature $e$ will be reattracted to again lock the carbon-holder C in proper position, and the action continues until the carbon electrodes of the first set are entirely consumed. With this arrangement and mode of operation a very light (and consequently sensitive) armature can be used, so that the slightest change in the resistance will allow the upper carbon to descend, which descent is very slight and takes place at intervals of not more than five seconds, so that the voltaic arc is by this means kept uniform and steady. The variation of the current does not affect the electro-magnet I, and its armature is only released by the breakage of the current. When the armature $i$ is so released, (which is effected by the spring K or its equivalent,) as it moves upward it carries up the rod H, so as to put the escapement-lever G in the position shown in Fig. 11, which locks the first set of carbons B in a separated condition, and allows the second set of carbons B′ to move together and within a few seconds establish the voltaic arc between them, and so on with a slight modification of the lever G where three or more sets of carbons are used.

By the use of my improvements in an electric lamp the following advantages are obtained:

First, double security of an absolute light, as when the arc is broken in one set of carbons it will be immediately re-established in the other set.

Second, a lamp can be formed having a duration of sixteen or more hours, instead of a duration of six or eight hours, generally accomplished with a lamp having a single set of carbons.

Third, with the construction of parts as shown, a positive and reliable movement of the parts is effected without the use of springs or weights to accomplish the purpose.

Having thus fully described my said invention, what I claim, and desire to secure by Letters Patent, is—

1. The combination, in a single electric lamp provided with two or more sets of carbons, of a mechanism, substantially as described, the action of which is to allow only one set to be brought into connection for the passage of the electric current and the formation of the voltaic arc, the next succeeding set being automatically released by means of an armature to form the voltaic arc on the breakage of the current in the preceding set, substantially as and for the purpose set forth.

2. The combination, in an electric lamp having two or more sets of carbons, of an escapement-lever, G, or its equivalent, and operating-magnet I, when the same is used to allow one set of carbons to come together to form the voltaic arc, and when the arc is broken will cause it to be re-established automatically in the next set, substantially as and for the purpose set forth.

3. In a single electric lamp of the arc type having two or more sets of carbons, the lower members of which are by mechanism, substantially as described, withdrawn or let down simultaneously, for the purpose set forth.

4. In an electric lamp having two or more carbons, the retarding devices D D′, controlled by electro-magnet E, and provided with escapement flies or spiders $g\ g'$, in combination with escapement-lever G, controlled by electro-magnet I, substantially as and for the purpose set forth.

5. The combination, in an electric lamp, of the single electro-magnet I and armatures $e\ i$ with the carbon-holder, retarding device, and mechanism for moving the lower-carbon holder, substantially as and for the purpose set forth.

In testimony of said invention I have hereunto set my hand.

CHARLES HEISLER.

In presence of—
 ROBERT BURNS,
 L. C. MORSE.